Jan. 20, 1970  D. J. BEECHER  3,490,641
PRESSURE VESSEL CLOSURE AND CLOSURE FASTENER
Filed Feb. 27, 1968  6 Sheets-Sheet 1

INVENTOR
DONALD J. BEECHER

BY Shanley & O'Neil
ATTORNEYS

United States Patent Office 3,490,641
Patented Jan. 20, 1970

3,490,641
PRESSURE VESSEL CLOSURE AND
CLOSURE FASTENER
Donald J. Beecher, Erie, Pa., assignor to American
Sterilizer Company, a corporation of Pennsylvania
Filed Feb. 27, 1968, Ser. No. 708,559
Int. Cl. B65d 43/16, 51/10
U.S. Cl. 220—38                                  17 Claims

ABSTRACT OF THE DISCLOSURE

Pressure vessel closure system in which a door is mounted by supporting and operating mechanism for (1) swinging movement relative to the vessel doorway between wide open position and an intermediate position noncoincidental with the doorway, (2) movement from the intermediate position in a plane parallel to the doorway of the vessel to a position coincidental with the doorway and (3) movement from the last position into closing and sealing relationship with the doorway.

A pressure vessel closure system having a safety pressure release associated with the second movement operative in the event of malfunctioning of the closure operating mechanism.

A closure fastener system for a pressure vessel closure system utilizing a plurality of resiliently mounted nonresilient wedging elements for carrying out closing, sealing and locking operations associated with the third movement.

CROSS-REFERENCE TO RELATED APPLICATION

Ser. No. 638,513, filed May 15, 1967.

BACKGROUND OF THE INVENTION

Pressure vessels for many purposes, including sterilization of objects, are used in numerous environments. These vessels may be relatively small or can be so large as to accommodate vehicles for carrying the objects to be treated. In the latter case it is desirable for the interior bottom wall or floor of the vessel to be in the same plane as the surrounding floor so that trucks, wheeled racks, etc. of considerable weight can be wheeled into and out of the vessel for charging and discharging it. In some cases these pressure vessels are designed for vacuum treatment of objects and in either case closure sealing presents problems.

In apparatus of this kind it is necessary to have door constructions which can withstand considerable internal pressure or atmospheric pressure in the case of vacuum treatment. For safety reasons it has been deemed desirable in one form of these vessels to have a closure fastening mechanism which upon final movement of the closure into closing position makes positive structural connection with the vessel in such a manner that the pressure being resisted is not in the direction of the final movement of the closure into closing position. On the other hand the main movement of the closure to a wide open position for charging and discharging the pressure vessel with objects to be treated is a swinging movement around a vertical axis. An example of a pressure vessel closing system of this kind is that disclosed in Stratton et al. Patent 2,780,-384 wherein a large swinging movement of the closure is combined with a small final closing movement in the plane of the pressure vessel opening being closed.

A closure and closure fastening arrangement of similar functioning components is disclosed in Foster U.S. Patent 3,119,512.

Copending patent application Ser. No. 638,513 discloses yet another form of pressure vessel closure system in which final movement of the vessel into closing position presents cooperating parts for coaction to resist pressures directed normal to the direction of final movement of the closure. The closure disclosed in this patent application solves many of the mechanical problems of the prior art devices but requires appreciable overhead space for the vertical movement of the closure into full open position.

The pressure closure system of the present invention retains the advantages of the system of copending patent application Ser. No. 638,513 while eliminating the need for overhead clearance space for closure operation. The present invention also incorporates numerous mechanical and functional advantages over all pertinent prior art apparatus.

As mentioned above, it is desirable to have the floor of the pressure vessel coplanar with the surrounding floor and, except in the case of the copending application Ser. No. 638,513, this presents problems in respect to obtaining a full open position of the closure. Lodge U.S. Patent 3,346,992 shows a solution for the problem presented by a door swinging on a verticle axis. The present invention, in addition to the other advantages inherent in its coacting components and functioning, nicely solves the problem of floor clearance as part of its normal functioning.

The above and numerous other advantages of the pressure vessel closure system of the present invention will become evident from the appended drawings and the following specification which disclose preferred embodiments thereof.

BRIEF DESCRIPTION OF THE DRAWINGS

FIGURE 16 is a schematic illustration of an electrical circuit diagram and hydraulic liquid flow sheet for

DESCRIPTION OF THE PREFERRED EMBODIMENTS

Figure 1A:
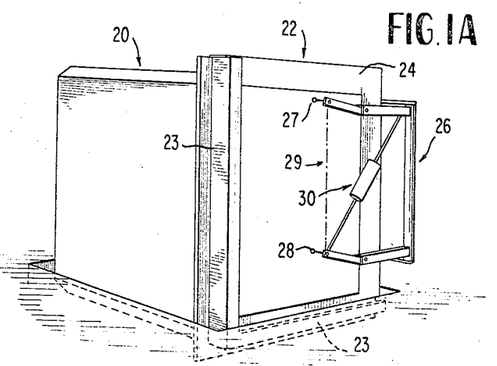
FIGURES 1A, 1B and 1C are diagrammatic views in perspective of a preferred embodiment of the present invention showing the relationship of the pressure vessel and the closure with the closure in three different positions.
Figure 1B:
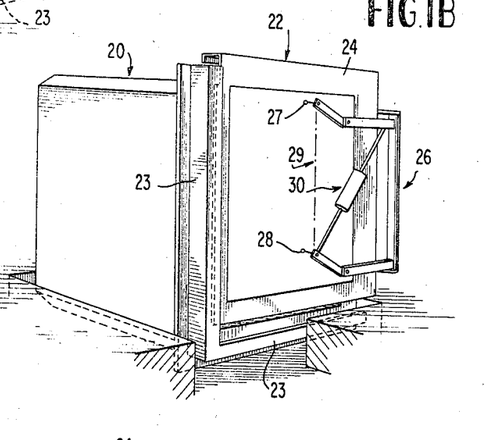
Figure 1C:
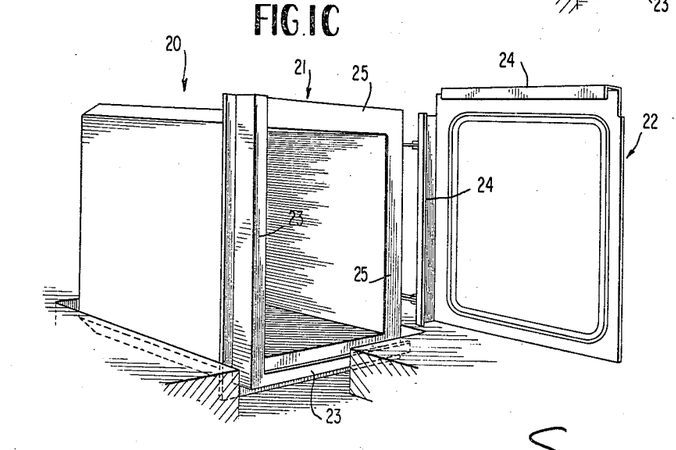

Referring first to FIGURES 1A, 1B and 1C, a pressure vessel such as sterilizer autoclave is indicated generally at 20 which includes doorway structure indicated generally at 21 and a door indicated generally at 22. Door 22 is hinged in a manner not shown in these figures for swinging movement around a vertical axis as shown in FIGURE 1C. The pressure vessel carries adjacent the doorway on one vertical side and on the bottom, angle flanges 23 and the door carries on the other side of the vessel and on the top, angle flanges 24. On at least the top and the hinged side of the vessel, doorway 21 carries projecting flanges 25 having rearwardly facing surfaces. Between the door hinge structure and the door there is interposed a door supporting and operating mechanism indicated generally at 26 and the door is supported on mechanism 26 at points diagrammatically indicated at 27 and 28. Door carrying mechanism 26 incorporates a parallelogram linkage system indicated generally at 29 in FIGURE 1B, which by virtue of four pivots at the apices and a force delivering instrumentality indicated generally at 30 can raise and lower the door while maintaining the door in a plane parallel to the vessel doorway 21.

These pressure vessels are often of large size which will accommodate wheeled charging vehicles and in the present case the vessel is shown with its lower portion sunk below the level of the surrounding floor so as to bring the surrounding floor and the interior bottom wall or floor of the vessel into the same plane.

It will be evident from FIGURES 1A, 1B and 1C that a pressure vessel is presented which can be closed by swinging the closure or door around its hinges and then when the door is in proper relation to flanges 23 and 25, the door can be lowered by the parallelogram linkage 29 so as to cause portions of flanges 23, 24 and 25 to be in overlying-underlying but spaced relationship with each other. It follows that any suitable means positioned between the overlying-underlying flange portions which will act to separate each pair of overlying-underlying flange portions will force the door into engagement with doorway 21 for closing the pressure vessel.

The fact that the embodiment of the pressure vessel illustrated has greater height than width, taken with the parallelogram linkage operation, makes it possible to raise the door clear of the surrounding floor for swinging movement while preserving practical and economical proportioning of the parts.

Referring now to FIGURES 2 to 12, inclusive, which illustrate an actual embodiment, the important functional parts and their operation will be described.

Figure 3:
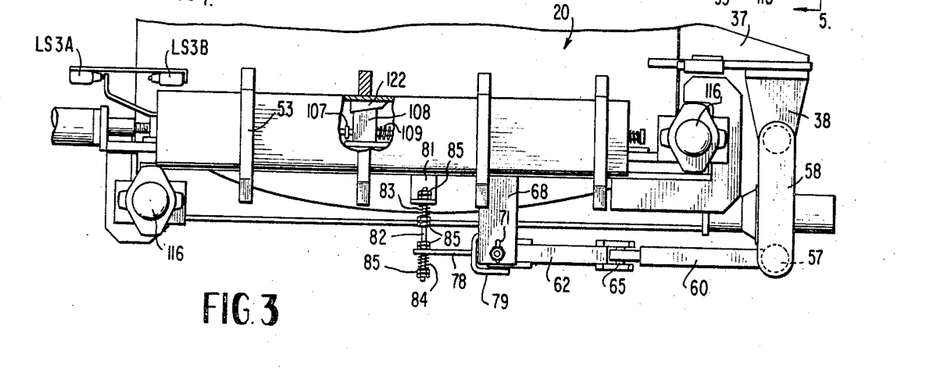
FIGURE 3 is a fragmentary top plan view of the apparatus of FIGURE 2 with a portion broken away for clarity.
Figure 5:
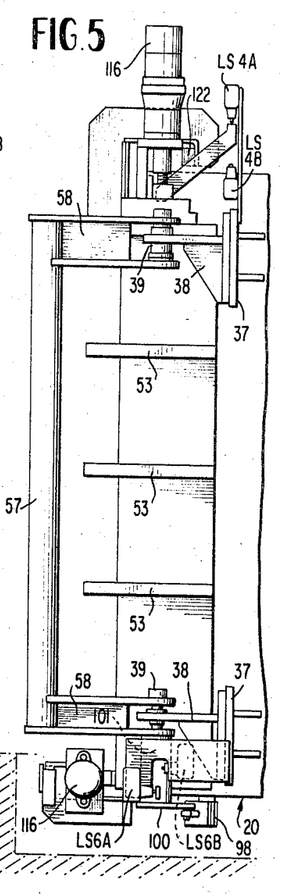
FIGURE 5 is a fragmentary side elevational view along the line 5—5 of FIGURE 2.

In this embodiment, vessel 20 is shown as a spaced wall chamber with the doorway 21 being made up of a rectangular frame member 32 surrounding the opening into the chamber on four sides and carrying a continuous sealing surface made up of strips 33 at the top, bottom and right side and strip 34 extending along the left side of the doorway. The vessel, in this case doorway frame member 32, carries flange 23 on the left-hand vertical side and bottom, this angular flange being made up of a supporting leg 35 and a free leg 36. As best shown in FIGURES 3 and 5, the other vertical side of vessel 20 carries brackets 37 on which are mounted hinge supports 38 carrying hinge structures 39 which pivotally mount door 22 for swinging movement around the vertical coaxial pivots of hinge structures 39.

The pressure vessel closure or door 22 is made up of a central panel 41 and an integral rectangular marginal portion made up of a botom horizontal section 42, a top horizontal section 43, a left-side vertical section 44 and a right-side vertical portion 45. The term marginal as used in this specification and claims is used in the functional sense to designate the portions of the door which are in opposed relation to the door frame, whether or not they are peripheral. The upper horizontal section and the right-hand side of the door each carry a flange 24 which is made up of a supporting leg 47 and a free leg 48. The rearwardly facing side of the door carries a continuous, resilient gasket 50 for engagement with sealing surface strips 33, 34, the gasket being held in position by a gasket retainer 51.

The flanges 23 and 24 have reinforced connection with the doorway frame and the door, respectively, in the form of buttressing members 53 on both and in the form of reinforcing plates 54 on the door as shown in some of the figures. The forwardly facing marginal portions on the remaining two sides of the door carry reinforcing plates 55.

Door 22 is supported on hinges 39 by door supporting and operating mechanism 26 made up of a post 57 rigidly connected to and spaced forwardly of the hinge pivots by brackets 58, the post 57 carrying a top arm 60 and a bottom arm 61 rigidly connected thereto. Arms 60 and 61 are the same length and include at their free ends equal length link members 62 and 63, respectively, with pivotal connections 65 and 66 permitting swinging movement of link members 62 and 63 in the vertical plane of the post and arms 60, 61.

The door is carried by the outer ends of link members 62 and 63 through the medium of a pair of horizontally projecting brackets 68, 69. Bracket 68 incorporates a slot 71 which receives the threaded shank of an eye bolt 72 which in turn receives a pivot pin 73 which is rotatably received by the outer end of link member 62. Nut 74 on either side of braket 68 can be tightened to immobilize eye bolt 72 relative to bracket 68 and slot 71. A similar construction but with a circular hole instead of a slot connects the outer end of link means 63 to bracket 69 by eye bolt 75 and pivot pin 76. It will be apparent that the pivotal connections 65, 66, rigid linking members 62 and 63 pivotal connections 73 and 76 form a parallelogram linkage for supporting the door 22. Adjustment of the plane of the face of the door to achieve vertical alignment with the doorway is accomplished by movement of eye bolt 72 in slot 71, nuts 74 being tightened when the axis of eye bolts 72 and 75 is parallel to the doorway.

Limited angular adjustment of the plane of the door face relative to the axis of eye bolts 72 and 75 is achieved by means of extension 78 of bifurcated bracket 79 carried by the outer ends of pivot pin 73. The free end of extension 78 carries an opening and aligned with this opening is an opening in the forward face of a bracket 81 carried by the forwardly facing side of the door. The openings in the extension 78 and bracket 81 slidably receive a rod 82 having a pair of springs 83, 84 and four sets of lock nuts 85. By the indicated positioning of the springs relative to bracket 81 and extension 78 and by adjustment of the lock nuts 85, the angular plane of the door face can be aligned with the coacting face of the door frame after the door face has been located in slightly spaced relation to the door frame by movement of the door on hinges 39.

Since the door moves on an arc around the pivots of hinge 39, some slight adjustment of the angularity of the door will be necessary as the door face moves into actual contact with the door frame. Springs 83, 84 accommodate this slight degree of movement.

Swinging movement of door 22 in the preferred embodiment is powered by an hydraulic cylinder 98 having a piston rod 99 connected to a crankshaft 100 which turns a tube 101 rigidly attached to lower bracket 58 of the door supporting and operating mechanism 26 (FIGURE 5), the axis of rotation of tube 101 coinciding with the axis of rotation of pivots 39.

As brought out at the beginning of this specification, the door in the present invention is designed for compound movement in going from a fully wide open position to a fully closed and sealed position with gasket 50 in sealing engagement with sealing strips 33, 34 of the door frame. Apparatus providing for swinging movement of the door has been described and as brought out above the second phase of movement of the door, namely in the plane of the door, is accomplished by the parallelogram linkage system. In the preferred embodiment this last movement is powered actuated by means 30 which is made up of a rigid link structure of adjustable length pivotally supported at 86 on a plate carried on post 57 and pivotally connected at its other end to the outer end of link member 63 at 87. The length of this link structure is changed by rotation of an internally threaded sleeve 89 on externally threaded shaft 90, shaft 90 being rigidly held by the free end of link portion 91 and sleeve 89 being rotated by an hydraulic motor 92. By means of a yoke 95 and pivotal connections 96, taken with pivot connection 86, universal movement of the upper end of the linkage structure is provided for to accommodate slight adjusting angular movements of door 22 relative to door supporting mechanism 26, as described above.

Figure 2:
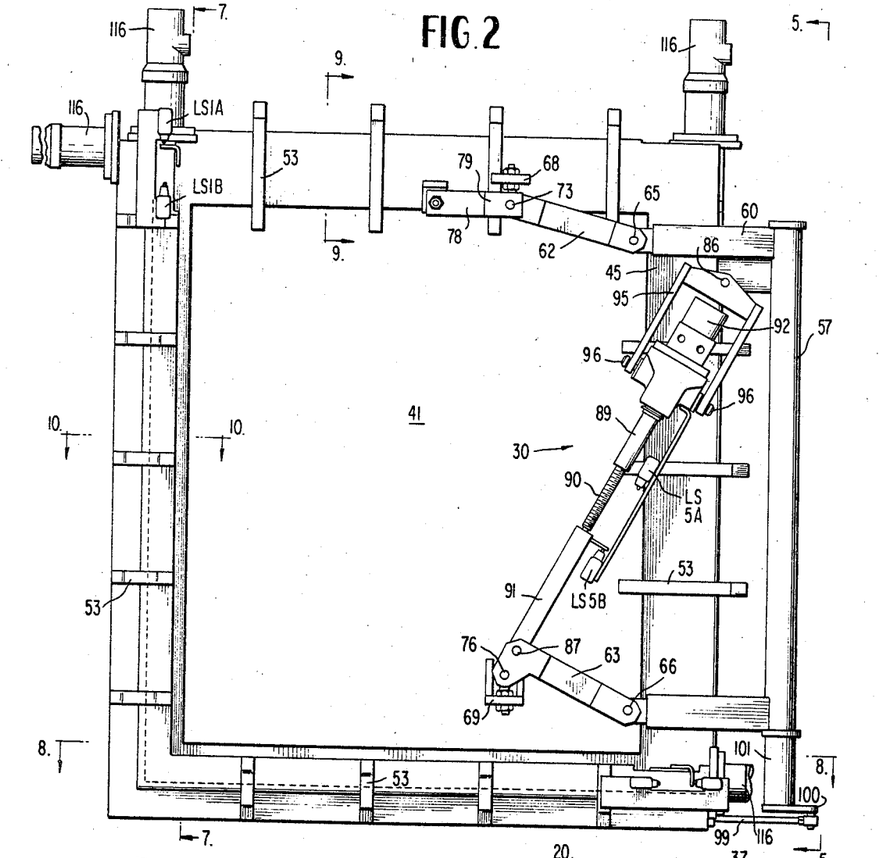
FIGURE 2 is a front view in elevation of an apparatus embodying the present invention.
Figure 4:
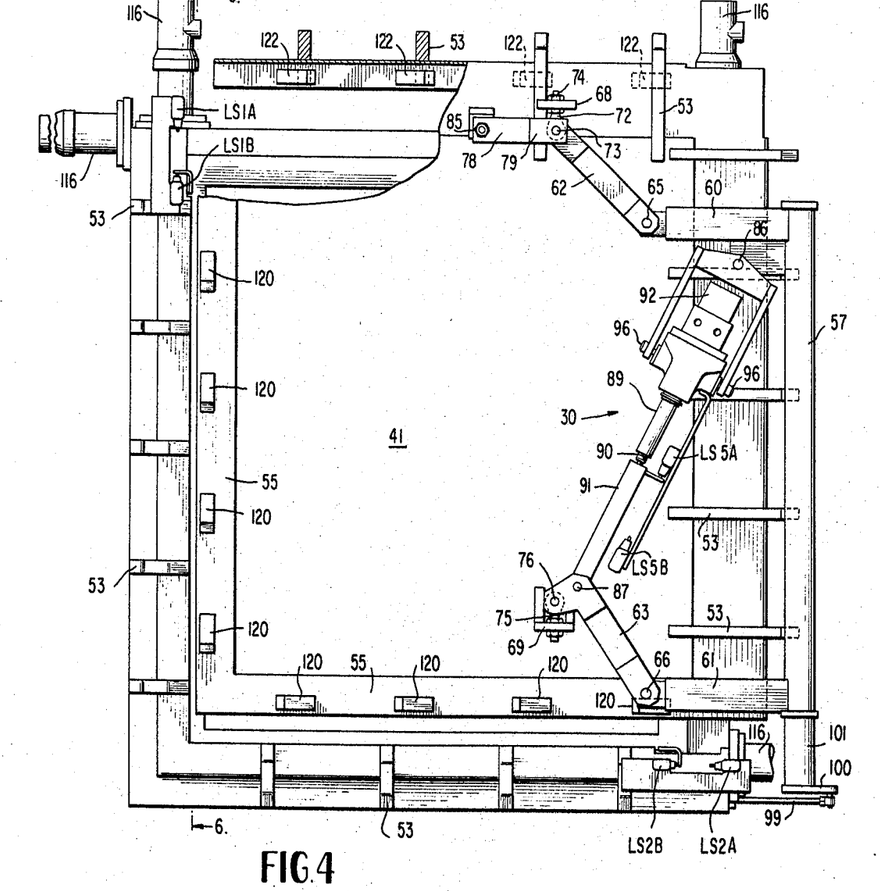
FIGURE 4 is a front elevational view corresponding to FIGURE 1 with the closure or door shown in an intermediate open position.

The two extreme positions of door 22 in its movement in the plane of the door and parallel to the plane of the doorway of the vessel are shown in FIGURES 2 and 4 and it will be noted that the parallelogram linkage has been actuated by extreme extended movement of shaft 90 in FIGURE 2 and extreme retracted movement of shaft 90 in FIGURE 4.

As mentioned above, door supporting and operating mechanism 26 positions door 22 in a first position above the doorway in a plane parallel to the plane of the door frame 21 and after downward diagonal movement in this plane the door is in a second position in coincident but spaced relation to the doorway before final movement of the door into a third position to place gasket 50 in sealing engagement with the sealing surface of strip sections 33, 34 of the door frame member 32. In the first and second positions, before the final movement the marginal portions 42, 44 of door 22 and the associated gasket 50 are positioned in slightly spaced relation to the door frame and associated sealing surface strips 33, 34 in order for these parts to clear one another during movement of the door in its plane. During this same movement from the first to the second positions the marginal portions of the door are kept widely spaced from the rearward faces of free legs 36 of flange 23 on the left-hand and bottom sides of the vessel and the free flanges 48 are kept widely spaced from rearward faces of projecting flanges 25 on the door frame 32.

With this construction and positioning, it will be evident that any suitable means acting between free flange 36 and door reinforcing plates 55 on the front of the door and between free flange 48 and the back of projecting flange 25 of door frame member 32 which will exert a force to separate these elements will cause the door to be urged toward closing position with gasket 50 in sealing engagement with sealing surface strips 33, 34 around the opening into the chamber. Whether a caming action, as in copending patent application Ser. No. 638,513 or the wedge and inclined plane action of the preferred embodiment about to be described, or any other mechanism for separating these elements is utilized, the broad desideratum of the present invention is accomplished.

Figures 11, 12:
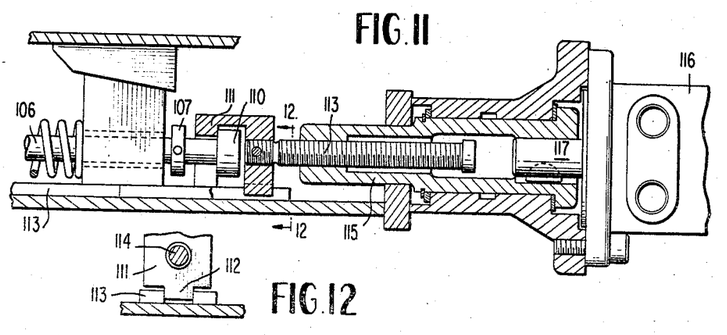
FIGURE 11 is an enlarged detail view with parts shown in section to illustrate operation of a functional component of the apparatus of the present invention.
FIGURE 12 is an enlarged view in section taken on the line 12—12 of FIGURE 11.

Referring now to the preferred embodiment of this door closing mechanism, attention is invited to FIGURES 6 through 12 wherein the four coacting mechanisms for accomplishing this purpose are illustrated. Since the four mechanisms do not differ in principle, only one need be described in detail. The same reference numerals have been applied to the others. In each case, the rearwardly facing side of free flange 36 in the case of the left-hand and bottom mechanisms and the rearwardly facing side of projecting flange 25 of door frame member 32 in the case of the top and right side mechanisms, carries brackets 105 which slidably receive force transmitting rod 106. Rod 106 has a plurality of rigidly attached spaced collars 104, 107. Movably mounted on rod 106 between adjacent pairs of collars 104, 107 are individual wedging elements 108. As illustrated in FIGURES 11 and 12, the end of each rod 106 is headed as at 110 and received in a coupling element 111 slidably keyed at 112 to a plate 113 mounted on the free flange 36 or the free flange 48 as the case may be. Member 111 receives and is pinned to an externally threaded shaft 114 which is threadedly coupled to an internally threaded, rotatable sleeve 115. Sleeve 115 is power actuated by an hydraulic motor 116 through motor power shaft 117. Each wedging element 108 makes sliding contact with a reinforcing and wear plate 118 similar to plate 113.

For coaction with wedging elements 108, the forwardly facing marginal portions of door 22 on the left-hand side and the bottom carry inclined plane elements 120 mounted on reinforcing plate 55. In like manner, the forwardly facing side of free leg 48 of flange 24 on the top side and the right-hand side of the door carries on its forwardly facing side inclined plane elements 122.

Figure 6:
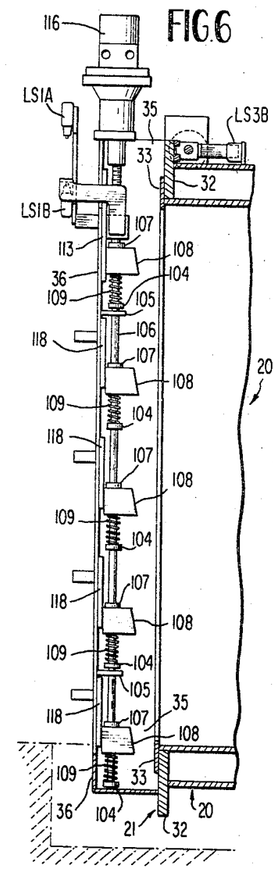
FIGURE 6 is a fragmentary view in vertical section taken along the line 6—6 of FIGURE 4.
Figure 7:
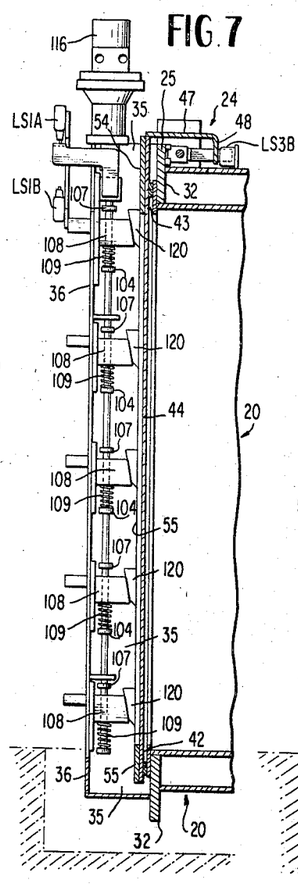
FIGURE 7 is a fragmentary view in vertical section taken along the line 7—7 of FIGURE 2.
Figure 8:
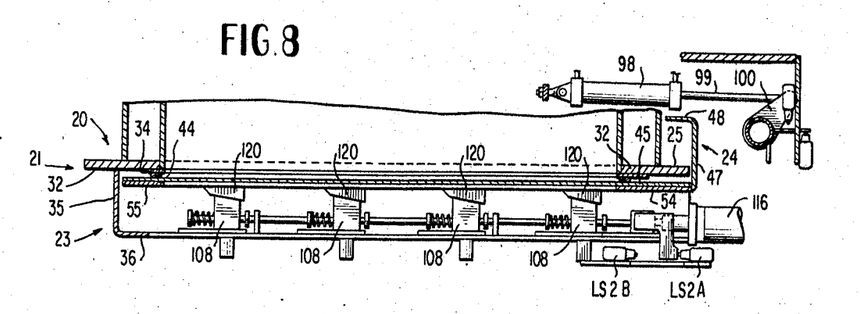
FIGURE 8 is a fragmentary plan view in section taken on the line 8—8 of FIGURE 2 with parts broken away for clarity.
Figure 9:
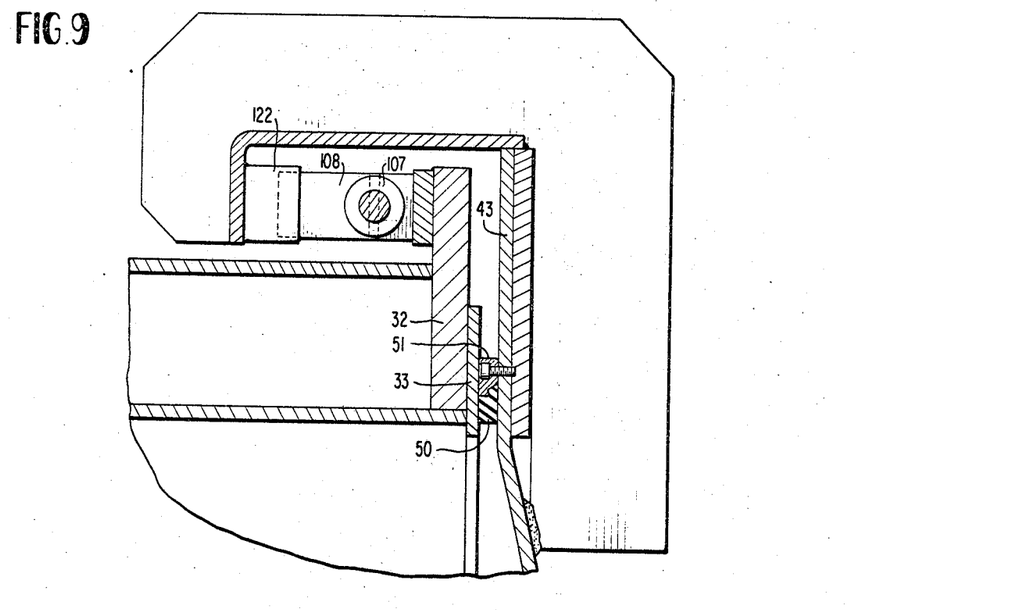
FIGURE 9 is a fragmentary view in vertical section taken on the line 9—9 of FIGURE 2.
Figures 10, 10A:
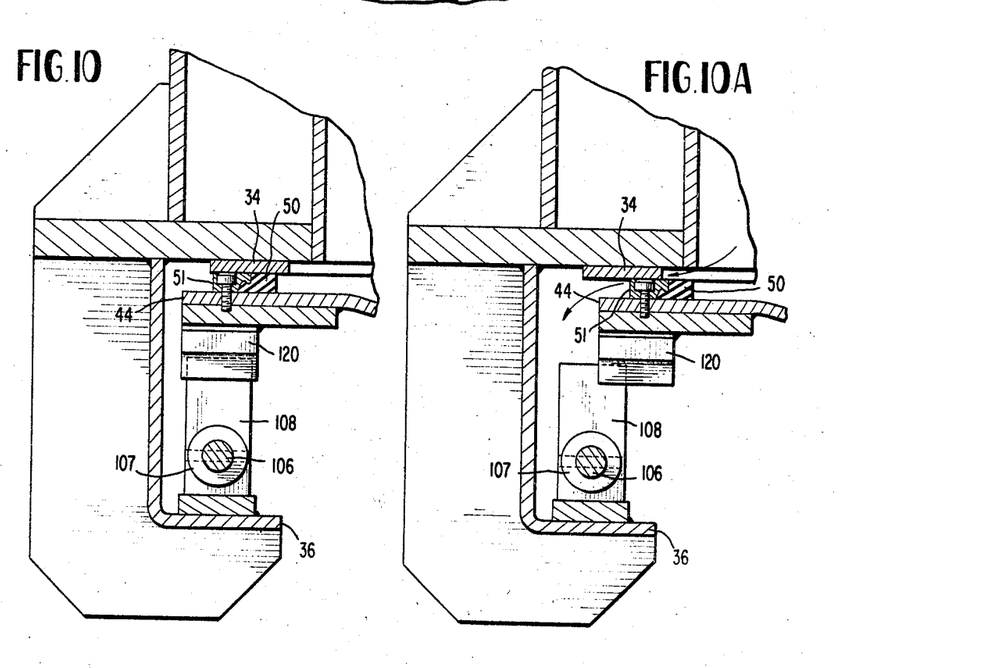
FIGURE 10 is a fragmentary plan view in section taken on the line 10—10 of FIGURE 2.
FIGURE 10A is a view corresponding to FIGURE 10 with certain of the parts in different relative positions.

Reference to FIGURES 6 and 7 will show that when the door 22 is in the intermediate position described above prior to being urged into closing and sealing position, the wedging elements 108 are in the position shown in FIGURE 6, i.e., with the threaded shaft 130 in its most extended position. With the door properly aligned in parallel and coinciding relation to the door frame, as provided for by slot 71 and adjusting nuts 85 on rod 82, the wedging surfaces of wedging elements 108 will be lined up with the inclined surfaces of elements 120 (and 122 on the door) so that on rotation of sleeves 115 driven by the hydraulic motors 116, rods 106 move in the direction which will cause collars 104, acting through springs 109, to urge wedging elements 108 along inclined plane surfaces of elements 120 and 122. Each spring 109 resiliently urges its associated wedging element 108 along the inclined plate of its associated element 120, 122 with a separate force which depends upon the degree of resistance to movement encountered by the wedging element in moving along the inclined plane. In this way manufacturing tolerances of the coacting parts of the wedging system are compensated for and expensive machining and extremely accurate positioning of the coacting parts of the system can be avoided where an economical structure is desired. The wedge system of the present invention also has utility with springs 109 omitted where the cost of matching the wedging surfaces is not a factor or the spring action is not desired for any reason.

Of course, since as pointed out above, any means for supplying the desired separating force can be used in the broad combination of the present invention, the wedging means formed by the specific wedge and inclined plane mechanism just described are not the only means for carrying out this function in the broadest concept. In fact, in this specification and the appended claims where the terms "wedging" and "wedging means" are used, a camming action and means such as those of copending application Ser. No. 638,513 are embraced within their meanings.

Figure 13:
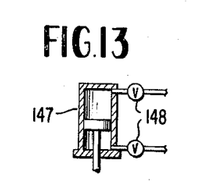
FIGURE 13 is a diagrammatic showing of a functional component which can be substituted for that illustrated in detail in FIGURE 11.

The actuating mechanism illustrated in FIGURE 11 inherently locks each rod 106 in any desired position where the motor stops and therefore where springs 109 are not used, collars 104 would hold each wedging element 108 locked in door-sealing position. By designing the angle of inclination of the coacting surfaces of elements 108 and 120, 122 so that frictional forces between the surfaces are greater than the force component tending to move the surfaces relative to one another as a result of pressure within the vessel, springs 109 can be used without danger of excessive pressure in the vessel moving the wedges against the spring action and in fact in such case no locking means are necessary for rods 106. In such case an hydraulic piston and cylinder device 147, diagrammatically illustrated in FIGURE 13 can be substituted for each hydraulic motor of FIGURE 11 and operated without locking valves. A similar substitution can be made for motor 92 and the associated screw thread connections but in such case one or more valves 148 would be required to lock the piston in the desired position.

To unlock the closure fastener system, motors 116 are operated to move rods 106 in the reverse direction until collars 107, acting as knock out members, disengage wedging elements 108 from inclined surfaces 120, 122.

Figure 14:
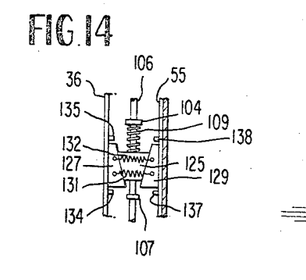
FIGURE 14 is a diagrammatic showing in elevation of a modification of a functional component of the preferred embodiment.
Figure 15:
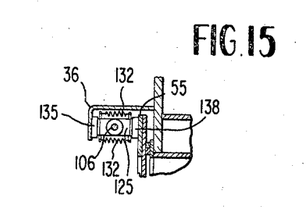
FIGURE 15 is a diagrammatic showing in plan of the device of FIGURE 14.

Referring now to FIGURES 14 and 15 a modification is shown of the means for wedging the closure into closing and sealing relation with the vessel doorway. In this modification a complete wedging unit, including a wedge element and two inclined plane surface elements, is carried by rod 106. This is accomplished by having the two-faced wedging element 125 juxtaposed with two complementary inclined surface elements 127 and 129 with the coacting wedging surfaces being held in contact by duplicate springs 131, 132 at each side of the assembly. The free leg 36 of the flange 23 (or the free leg 48 of the flange 24) carries a pair of abutment elements 134, 135 disposed on opposite sides of each inclined plane element 127 and the door reinforcing plate 55 (or the back of the flange projection 25 of doorway frame member 32) carries a pair of spaced abutments 137, 138 disposed on opposite sides of each inclined surface element 129, which restrain movement of these inclined plane elements to a desired amount while permitting the assemblage to have self-adjusting relative movement during wedging action. As in the previously described modification, rod 106 may be carried by the flange 23 and the flange 24.

It will be apparent that with this modification a very slight degree of movement of rod 106 will result in a greater wedging action while still maintaining a favorable slope relative to friction locking. Retraction of rod 106 from the extreme wedging position results in the inclined plane elements moving upward into engagement with abutments 135 and 138 thereby breaking the frictional locking action of the wedging surfaces and permitting the assembly to collapse by relative upward movement of wedging element 125 relative to inclined plane elements 127 and 129.

It will be noted from FIGURES 7, 8, 9 and 10 that section 34 of the sealing surface strip carried by the doorway around the opening of the vessel is narrower than the remaining sections. As best shown in FIGURE 10A, by this proportioning of the parts, accidental movement of the door in the plane of the door while in locked position results in the gasket 50 disengaging from sealing strip 34 while the wedging surfaces still have an area of overlap. In such case pressure in the chamber escapes between the sealing surface 34 and the gasket retainer bar 51, there being no perfectly mating surfaces involved in this area. This permits a gradual and safe decompression of the chamber which is an essential safety measure in many environments of use.

Figure 16:
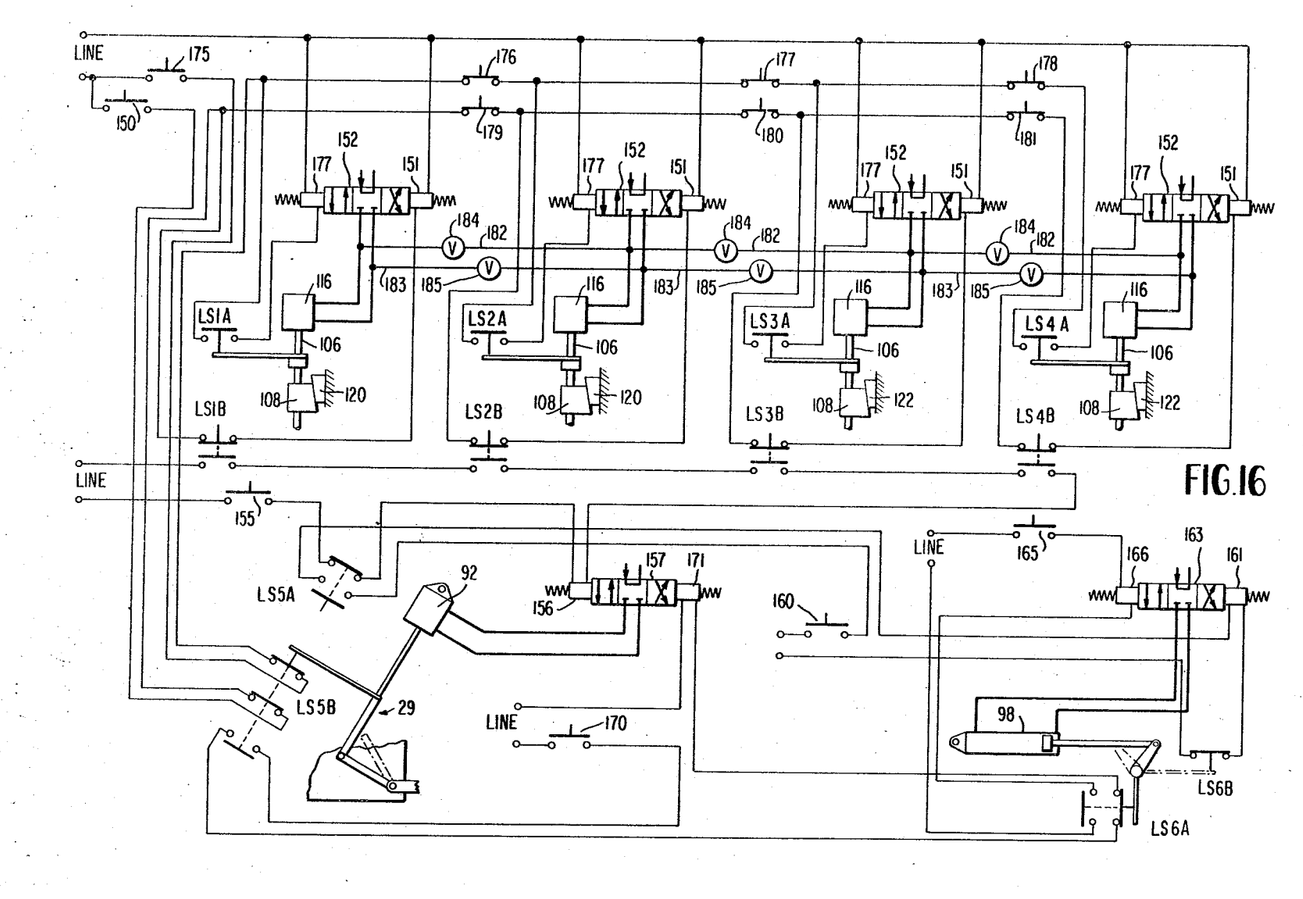

A plurality of limit switches are shown in the preferred embodiment and the schematic diagram of FIGURE 16 shows how these limit switches can be used in conjunction with push buttons for sequential closing and opening of the pressure vessel by means of electrical circuits and hydraulic pressure equipment.

FIGURE 16 diagrammatically illustrates a push button control system in conjunction with limit switches, the locations of which are shown in FIGURES 4, 5, 7, 8 and 10, for carrying out separate functions of the door. The flow sheet for the hydraulic pressure fluid connections is conventional and includes tandem spool, solenoid operated, hydraulic valves illustrated by the accepted symbol of the Joint Industrial Congress. To simplify description of the operation of the device the limit switches are indicated in the drawings by reference characters LS 1A, LS 1B, etc., which in this manner show the cooperating relationships of the limit switches. When a solenoid of an hydraulic valve is energized the tandem spool valve moves toward the energized solenoid and the schematically illustrated associated springs return the valve to the intermediate position when neither solenoid of the valve is energized.

The movable elements in FIGURE 16 are indicated in solid lines with the door in closed relation to the pressure vessel and with the wedging elements locked in closure sealing position. To open the door a button is pressed to close switch 150. The electrical circuit acting through closed limit switch 5B and parallelly connected closed limit switches 1B, 2B, 3B and 4B energizes solenoids 151 of each spool valves 152. This moves the four spool valves 152 to the right and connects the pressure side of the hydraulic system to that side of each hydraulic motor 116 which moves the associated rod 106 downwardly to disengage the wedging elements 108 from the inclined surface elements 122. Extreme movement of rods 106 actuates limit switches 1A, 2A, 3A and 4A to deenergize solenoids 151. A button is then pressed which closes switch 155 and this energizes solenoid 156 which moves spool valve 157 to the left thereby feeding hydraulic pressure fluid to motor 92 to lift the door. On extreme movement of the door operating mechanism 29, limit switch 5A is actuated to stop motor 92. A button is then pressed to close switch 160 which energizes solenoid 161 to move spool valve 163 to the left to cause hydraulic pressure fluid to move the piston of hydraulic cylinder 98 to the left to swing the door open. Extreme movement of the piston of hydraulic cylinder 98 opens limit switch 6B which cuts off power to solenoid 161 thereby stopping movement of the door.

To reverse the sequence of operations, a button is pushed to close switch 165 which energizes solenoid 166 and thereby move spool valve 163 to the right. This feeds hydraulic pressure fluid to the other end of hydraulic cylinder 98 to bring about the door closing movement, with extreme movement actuating limit switch 6A to stop operation of the door closing cylinder 98. A button is then pressed to close switch 170 which energizes solenoid 171 which in turn moves spool valve 157 to the right. This supplies hydraulic pressure fluid to motor 92 in the reverse direction to cause the door to be lowered until limit switch 5B is actuated to break the electrical circuit and stop movement of the door. A button is then pressed closing switch 175 which energizes parallelly connected solenoids 177 which move spool valves 152 to the left. This supplies hydraulic fluid under pressure to hydraulic motors 116 to draw the wedging elements into wedging relation and eventually actuate limit switches 1A, 2A, 3A and 4A to stop movement of rods 106 against springs 109. The closure is thereby moved toward the door frame against the resilient gasket 50 into closing position. The various electrical circuits and switches illustrated in FIGURE 18 prevent improper sequential movements of the door. It is to be noted that the provision of springs 109 between collars 107 and wedging elements 108 makes possible the use of limit switches 1A, 2A, 3A and 4A, whereas dependence solely on perfectly machined, rigidly positioned wedging elements would make the use of limit switches at this point impractical.

It will be readily apparent to one skilled in the art that by adding a pair of electrical contacts to each of limit switches 1B, 2B, 3B and 4B with the pairs of contacts connected in series and then substituting such a series circuit for ganged switches 155A, 155B, 155C and 155D, the second operation above described would take place automatically. In like manner, by adding another pair of contacts to limit switch 5A and substituting these contacts for those of switch 155, the next operation would take place automatically. By following this procedure for each of the three movements of the door in opening and closing, only one button would be necessary for opening the door and one for closing the door.

The applicant has found that in some instances it is preferable to use a single spool valve 152 instead of the four spool valves illustrated and by manifolding the hydraulic fluid output from the single spool valve, all four motors 116 (or cylinders 147) can be actuated simultaneously. FIGURE 16 shows auxiliary hydraulic fluid pressure conduits 182 and 183 controlled by valves 184 and 185 for this purpose. In this method of operation, previously closed switches 176, 177, 178, 179, 180 and 181 are placed in open position which takes all the spool valves except the first spool valve on the left in FIGURE 16 out of the electrical circuit. Now with valves 184 and 185 open, operation of spool valve 152 will connect all four motors 116 (or cylinders 147) with the pressure fluid source to apply force to all the rods 106 simultaneously. Otherwise the closure and closure fastener operation will be carried out in the same manner as just described.

It will be obvious to one skilled in the art that a single motor 116 and associated elements 111, 113, 115 (or cylinder 147) can be used for actuating rods 106 with the free end of the first rod 106 and the associated end of each succeeding rod 106 around the periphery of the vessel being interconnected for concerted identical movement but at right angles to each other. A similar arrangement is disclosed in copending application Ser. No. 638,513.

In any of the foregoing cases, actuation of rods 106 so as to compress springs 109 to urge wedge elements 108 into wedge engagement with their coacting inclined surfaces 120, 122 will result in what might be termed random movement of the wedging elements 108. By this is meant that wedging elements 108 will move randomly and independently of one another as the door moves into seal compressing position. This occurs because of the resilient mounting of wedging elements 108 and the fact that resistance to movement of each wedging element 108 relative to its associated inclined plane 120 or 122 will depend upon the amount of resistance present between the coacting surfaces at that point and this will keep changing for each point as the closure moves inwardly against the gasket. Thus an efficient, evenly distributed, closing force is applied around the periphery of the closure.

The present invention also contemplates what might be called sequential action of the closure fastener system and this is accomplished by initially opening switches 176, 177, 178, 179, 180 and 181. Each of these six switches can have its own actuating button and so long as switch 150 or switch 175 is operated initially, each of the other motors 116 can be operated in sequence by the actuation of switches 176, 177 and 178 where switch 175 has been closed or of switches 179, 180 and 181 where switch 150 has been closed. In this way each of motors 116 can be actuated in sequence from left to right in FIGURE 16 to tighten up the associated side of the closure fastener and this may be desirable with some types of closure mountings. Obviously more complicated wiring can be utilized to make possible sequential operation of the individual motors 116 in any order to serve best the peculiarities of the closure mounting.

This specification and the drawings disclose preferred embodiments of the present invention. The scope of the present invention is to be measured by reference to the appended claims.

I claim:
1. A pressure vessel closure mechanism comprising:
(a) a pressure vessel having a rearwardly facing marginal portion on one side,
(b) doorway means forming an opening in the pressure vessel, the doorway means having a forwardly facing marginal portion presenting a sealing surface surrounding the opening,
(c) a door having a forwardly facing marginal portion and having a rearwardly facing marginal portion presenting a sealing surface shaped to coact with the sealing surface of the doorway means (b) to close the vessel hermetically when the two sealing surfaces are urged into sealing engagement with each other,
(d) means carried by the vessel on a side of the opening other than the side of the rearwardly facing marginal portion, the means projecting around and having a rearwardly facing portion overlying the forwardly facing marginal portion on the door and in spaced relation thereto,
(e) means carried by the door on the one side of the opening projecting around and having a forwardly facing portion overlying the rearwardly facing marginal portion on the vessel and in spaced relation thereto,
(f) means movable relative to and coacting with means (d) and means (e) for moving the door in a direction substantially normal to the doorway means,
(g) means independent of means (f) for moving the door substantially parallel to the forwardly facing marginal portion of the doorway means (b) and in a direction to move the forwardly facing marginal portion of the door out of underlying relation with the rearwardly facing portion of means (d) and to move the forwardly facing marginal portion of means (e) out of underlying relation with the rearwardly facing portion on the vessel, and
(h) means pivotally mounting the door for swinging movement of the door in a plane disposed at an angle to the forwardly facing marginal portion of doorway means (b) when means (g) have moved the door and means (e) out of underlying relation with means (d) and the rearward facing portion on the vessel respectively.

2. The combination claimed in claim 1 including
(a) wedging means having elements movable relative to doorway means (b) and the door forming part of means (f) of claim 1,
(b) means supporting the wedging means in the space between the rearwardly facing portion of means (d) of claim 1 and the forwardly facing marginal portion of the door and in the space between the forwardly facing portion of means (e) of claim 1 and the rearwardly facing marginal portion on the vessel when the forwardly facing marginal portion of the door is in underlying relation with the rearwardly facing portion of means (d) and the rearwardly facing marginal portion on the vessel is in underlying relation with the forwardly facing portion of means (e), and
(c) means for actuating the wedging means to exert separating forces between the rearwardly facing portion of means (d) and the forwardly facing marginal portion of the door and between the forwardly facing portion of means (e) and the rearwardly facing marginal portion on the vessel to cause the continuous sealing surface of the forwardly facing marginal portion of doorway means (b) and the continuous sealing surface of the rearwardly facing marginal portion of the door to come together to hermetically close the vessel opening.

3. The combination claimed in claim 2 including
(a) a plurality of spaced, wedging elements comprising each wedging means (a) of claim 2,
(b) separate power means for exerting a force to simultaneously move the plurality of spaced wedging elements associated with each means (d) and (e) of claim 1.

4. The combination claimed in claim 3 including
(a) resilient means interposed between each spaced wedging element and the associated power means to accommodate differing resistance to movement among the plurality of wedging elements in response to the force exerted by the power means.

5. A pressure vessel closure mechanism comprising:
(a) a pressure vessel having a rearwardly facing linear marginal portion on one side, (b) doorway means forming an opening in the pressure vessel, the doorway means having a forwardly facing marginal portion presenting a sealing surface surrounding the opening, (c) a door having a forwardly facing linear marginal portion and having a rearwardly facing marginal portion presenting a sealing surface shaped to coact with the sealing surface of the doorway means (b) to close the vessel hermetically when the two sealing surfaces are urged into sealing engagement with each other, (d) linear means carried by the vessel on a side of the opening other than the side of the rearwardly facing marginal portion, the linear means projecting around and having a rearwardly facing portion overlying the forwardly facing linear marginal portion on the door and in space relation thereto, (e) linear means carried by the door on the one side of the opening projecting around and having a forwardly facing portion overlying the rearwardly facing linear marginal portion on the vessel and in spaced relation thereto, (f) means for coacting with means (d) and means (e) for moving the door in a direction substantially normal to the doorway means, (g) means independent of means (f) for moving the door substantially parallel to the forwardly facing marginal portion of the doorway means (b) and along a line disposed at an angle to both the linear directions of linear means (d) and (e) and in a direction to move the forwardly facing marginal portion of the door out of underlying relation with the rearwardly facing portion of linear means (d) and to move the forwardly facing marginal portion of linear means (e) out of underlying relation with the rearwardly facing portion on the vessel, and (h) means pivotally mounting the door for swinging movement of the door in a plane disposed at an angle to the forwardly facing marginal portion of doorway means (b) when means (g) have moved the door and linear means (e) out of underlying relation with linear means (d) and the rearward facing portion on the vessel respectively.

6. The combination claimed in claim 5 including (a) wedging means having elements movable relative to doorway means (b) and the door forming part of means (f) of claim 5, (b) means supporting the wedging means in the space between the rearwardly facing portion of linear means (d) of claim 5 and the forwardly facing marginal portion of the door and in the space between the forwardly facing portion of linear means (e) of claim 5 and the rearwardly facing marginal portion on the vessel when the forwardly facing marginal portion of the door is in underlying relation with the rearwardly facing portion of linear means (d) and the rearwardly facing marginal portion on the vessel is in underlying relation with the forwardly facing portion of linear means (e), and (c) means for actuating the wedging means to exert separating forces between the rearwardly facing portion of linear means (d) and the forwardly facing marginal portion of the door and between the forwardly facing portion of linear means (e) and the rearwardly facing marginal portion on the vessel to cause the continuous sealing surface of the forwardly facing marginal portion of doorway means (b) and the sealing surface of the rearwardly facing marginal portion of the door to come together to hermetically close the vessel opening.

7. The combination claimed in claim 6 including (a) a plurality of spaced, wedging elements comprising each wedging means (a) of claim 6, (b) separate power means for exerting a force to simultaneously move the plurality of space wedging elements associated with each linear means (d) and (e) of claim 5.

8. The combination of claim 7 including (a) a rigid linear force transmitting means carrying the plurality of spaced wedging elements associated with each linear means (d) and (e) of claim 5, (b) a connection between the separate power means and the rigid linear force transmitting means for applying a force to the linear force transmitting means to actuate the plurality of spaced wedging elements associated with each linear means (d) and (e) of claim 5.

9. The combination claimed in claim 7 including (e) resilient means interposed between each spaced wedging element and the associated power means to accommodate differing resistance to movement among the plurality of wedging elements in response to the force exerted by the associated power means.

10. A pressure vessel closure mechanism comprising:

(a) a pressure vessel, (b) doorway means forming an opening in the pressure vessel, the doorway means having a rearwardly facing marginal portion and having a forwardly facing marginal portion presenting a continuous sealing surface surrounding the opening, (c) a door having a forwardly facing marginal portion and having a rearwardly facing marginal portion presenting a continuous sealing surface shaped to coact with the continuous sealing surface of the means (b) to close the vessel hermetically when the two sealing surfaces are urged into sealing engagement with each other, (d) means carried by the vessel on one side of the opening projecting around and having a rearwardly facing portion overlying a forwardly facing marginal portion of the door and in spaced relation thereto, such means being associated with a substantial section of, but not more than one half of, the perimeter of the marginal portion of the door, (e) means carried by the door on a second side of the opening projecting around and having a forwardly facing portion overlying the rearwardly facing marginal portion of doorway means (b) and in spaced relation thereto, such means being associated with a substantial part of another section of the marginal portion of the door but not more than one half of the perimeter of the marginal portion of the door, (f) means for moving the door substantially parallel to the forwardly facing marginal portion of doorway means (b) and in a direction to move the forwardly facing marginal portion of the door out of underlying relation with the rearwardly facing portion of means (d) carried by the vessel and to move the forwardly facing portion of means (e) carried by the door out of underlying relation with the rearwardly facing marginal portion of doorway means (b), (g) means pivotally mounting the door for swinging movement of the door in a plane disposed at an angle to the forwardly facing marginal portion of doorway means (b) when means (f) have moved the door and means (e) out of underlying relation with means (d) and doorway means (b) respectively, (h) wedging means having elements movable relative to doorway means (b) and the door, (i) means supporting wedging means (h) in the space between the rearwardly facing portion of means (d) and the forwardly facing marginal portion of the door and in the space between the forwardly facing portion of means (e) and the rearwardly facing marginal portion of doorway means (b) when the forwardly facing marginal portion of the door is in underlying relation with rearwardly facing portion of means (d) and the rearwardly facing marginal portion of doorway means (b) is in underlying relation with the forwardly facing portion of means (e), and (j) means for actuating wedging means (h) to exert separating forces between the rearwardly facing portion of means (d) and the forwardly facing marginal portion of the door and between the forwardly facing portion of means (e) and the rearwardly facing marginal portion of doorway means (b) to cause the continuous sealing surface of the forwardly facing marginal portion of doorway means (b) and the continuous sealing surface of the rearwardly facing marginal portion of the door to come together to hermetically close the vessel opening.

11. A pressure vessel closure mechanism comprising:
(a) a pressure vessel,
(b) a doorway means forming an opening in the pressure vessel, the doorway means having a forwardly facing marginal portion presenting a continuous sealing surface surrounding the opening,
(c) a door having a rearwardly facing marginal portion presenting a continuous sealing surface shaped to coact with the continuous sealing surface of the doorway means (b) to close the vessel hermetically when the two sealing surfaces are urged into sealing engagement with each other,
(d) vertically disposed means carried by the vessel on a first side of the opening projecting around and having a rearwardly facing portion overlying a forwardly facing vertically disposed marginal portion of the door and in spaced relation thereto,
(e) horizontally disposed means carried by the vessel on a second side of the opening and contiguous to the vertically disposed means (d) projecting around and having a rearwardly facing portion overlying a forwardly facing horizontally disposed marginal portion of the door and in spaced relation thereto,
(f) vertically disposed means carried by the door on a third side of the opening projecting around and having a forwardly facing portion overlying a rearwardly facing vertically disposed marginal portion of the doorway means (b) and in spaced relation thereto,
(g) horizontally disposed means carried by the door on a fourth side of the opening and contiguous to the vertically disposed means (f) projecting around and having a forwardly facing portion overlying a rearwardly facing horizontally disposed marginal portion of the doorway means (b) and in spaced relation thereto,
(h) means for moving the door in a plane substantially parallel to the forwardly facing marginal portion of doorway means (b) and substantially in the direction of the diagonal of the rectangle formed by the horizontal and vertical means (d), (e), (f) and (g) and in the direction to move the forwardly facing marginal portions of the door out of underlying relation with the rearwardly facing portions of means (d) and means (e).

12. The combination claimed in claim 11 including
(a) hinge means on the vessel along a marginal side of the door for mounting the door for swinging movement in a plane disposed at an angle to the forwardly facing marginal portion of the doorway means (b) of claim 11 when means (h) of claim 11 have moved the forwardly facing marginal portions of the door out of underlying relation with the rearwardly facing portion of means (d) and means (e) of claim 11,
(b) parallelogram linkage means forming part of means (h) of claim 11 connecting hinge means (a) and the door, and
(c) power contraction and expansion means forming part of means (h) of claim 11 connected to act in a direction substantially diagonally across the parallelogram linkage means.

13. A pressure vessel closure mechanism comprising:
(a) a pressure vessel,
(b) doorway means forming an opening in the pressure vessel, the doorway means having a forwardly facing marginal portion presenting a continuous sealing surface surrounding the opening,
(c) a door having a rearwardly facing marginal portion presenting a continuous sealing surface shaped to coact with the continuous sealing surface of the means (b) to close the vessel hermetically when the two sealing surfaces are urged into sealing engagement with each other,
(d) means carried by the vessel on one side of the opening projecting around and having a rearwardly facing portion overlying a forwardly facing marginal portion of the door and in spaced relation thereto, such means being associated with a substantial section of, but not more than one half of, the perimeter of the door,
(e) means carried by the door on second side of the opening projecting around and having a forwardly facing portion overlying a rearwardly facing marginal portion of doorway means (b) and in spaced relation thereto, such means being associated with a substantial part of a different section of the periphery of the door but not more than half of the perimeter of the door,
(f) means for moving the door substantially parallel to the forwardly facing marginal portion of doorway means (b) and in the direction of means (e) and away from means (d) to move the forwardly facing marginal portion of the door out of underlying relation with the rearwardly facing portion of means (d) and to move the forwardly facing portion of means (e) out of underlying relation with the rearwardly facing marginal portion of doorway means (b),
(g) means pivotally mounting the door for swinging movement of the door in a plane disposed at an angle to the forwardly facing marginal portion of doorway means (b) when means (f) have moved the door and means (e) out of underlying relation with means (d) and doorway means (b) respectively,
(h) wedging means for acting between doorway means (b) and the door,
(i) means supporting wedging means (h) in the space between the rearwardly facing portion of means (d) and the forwardly facing marginal portion of the door and in the space between the forwardly facing portion of means (e) and the rearwardly facing marginal portion of doorway means (b) when the forwardly facing marginal portion of the door is in underlying relation with rearwardly facing portion of means (d) and the rearwardly facing marginal portion of doorway means (b) is in underlying relation with forwardly facing portion of means (e),
(j) the sealing surfaces of the marginal portions of doorway means (b) and the door including a continuous resilient gasket on one of these two parts extending linearly around the opening and a continuous coinciding nonresilient surface on the other of these two parts extending linearly around the opening, the dimension of the resilient gasket and the dimension of the coinciding nonresilient surface in the direction of movement of the door by means (f) being such that sealing contact between the resilient gasket and the nonresilient surface is broken by movement of the door by means (f) at a point prior to the point of movement of the forwardly facing marginal portion of the door out of underlying relation with the rearwardly facing portion of means (d) and prior to the point of movement of the forwardly facing portion of means (e) out of underlying relation with the rearwardly facing marginal portions of doorway means (b).

14. A closure fastener for coaction with a vessel and a door closing the vessel comprising:
  (a) a rearwardly facing marginal portion carried by the vessel,
  (b) a forwardly facing marginal portion carried by the closure in opposed but spaced relation to the rearwardly facing marginal portion carried by the vessel,
  (c) means associating means (a) with the vessel and means (b) with the closure so that separation of means (a) from means (b) moves the closure toward closing relation with the vessel,
  (d) a plurality of spaced wedging means movable relative to the rearwardly facing marginal portion (a) and the forwardly facing portion (b),
  (e) means including a force transmitting means supporting the plurality of wedging means in the space between the rearwardly facing marginal portion (a) and the forwardly facing marginal portion (b),
  (f) means associated with means (a), (b), (d) and (e) causing means (a) and (b) to separate on movement of the wedging elements of (d) in one direction,
  (g) means associated with the force transmitting means for transmitting force from the force transmitting means to each of the spaced wedging elements to move the spaced wedging elements in the one direction,
  (h) resilient means interposed between each spaced wedging element and the associated means of (g) to accommodate differing resistance to movement along the plurality of spaced wedging elements in response to a force exerted by means (e) in the one direction.

15. The combination of claim 14 in which the means of (d) and (f) comprise wedge elements and associated inclined plane elements having surfaces in sliding contact with one another.

16. The combination of claim 15 in which the angle of the contacting surfaces of the wedge elements and the inclined plane elements is such that any force tending to move the closure in a direction normal to the one direction and away from the vessel has a component parallel to the surfaces which is insufficient to overcome the friction existing between these surfaces.

17. The combination of claim 15 in which
  (a) each wedging element incorporates two wedging surfaces,
  (b) each inclined plane element incorporates two inclined plane surfaces,
  (c) the wedging elements and the inclined plane elements are carried by the force transmitting means, and
  (d) abutment means are carried by one of the marginal portions for causing the contacting surfaces to move relative to one another to separate means (a) and (b) on movement of the force transmitting means in the one direction.

References Cited
UNITED STATES PATENTS

| 2,917,987 | 12/1959 | Hansen et al. | 220—38 X |
| 2,780,384 | 2/1957 | Stratton et al. | 220—38 |
| 3,119,512 | 1/1964 | Foster | 220—34 |

GEORGE T. HALL, Primary Examiner

U.S. Cl. X.R.

21—93